(12) United States Patent
Flachs et al.

(10) Patent No.: US 6,629,235 B1
(45) Date of Patent: Sep. 30, 2003

(54) CONDITION CODE REGISTER ARCHITECTURE FOR SUPPORTING MULTIPLE EXECUTION UNITS

(75) Inventors: Brian King Flachs, Georgetown, TX (US); Harm Peter Hofstee, Austin, TX (US); Kevin John Nowka, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/564,943

(22) Filed: May 5, 2000

(51) Int. Cl.[7] ............... G06F 9/44; G06F 9/54; G06F 9/38
(52) U.S. Cl. ............ 712/226; 712/27; 712/219; 712/245; 712/228; 712/237
(58) Field of Search .................. 712/237, 26, 27, 712/219, 245, 228, 226, 241, 23; 365/189.02

(56) References Cited

U.S. PATENT DOCUMENTS 4,954,988 A * 9/1990 Robb .................. 365/189.02
6,003,128 A * 12/1999 Tran .................... 712/241
6,115,808 A * 9/2000 Arora ................... 712/219

* cited by examiner

Primary Examiner—Daniel H. Pan
(74) Attorney, Agent, or Firm—Casimer K. Salys; Bracewell & Patterson, L.L.P.

(57) ABSTRACT

A condition code register architecture for supporting multiple execution units is disclosed. A master execution unit is coupled a master condition code register such that condition codes generated by the master execution unit are stored in the master condition code register. A non-master execution unit is coupled to a shadow condition code register such that condition codes generated by the non-master execution unit are stored in the shadow condition code register. A tag unit coupled to the master execution unit and the non-master execution unit such that an entry within the master condition code register can be read only when a corresponding entry within the tag unit is referenced to the master execution unit or the master condition code register.

12 Claims, 3 Drawing Sheets

CONDITION CODE REGISTER ARCHITECTURE FOR SUPPORTING MULTIPLE EXECUTION UNITS

BACKGROUND OF THE INVENTION

1. Technical Field

The present invention relates to an apparatus for data processing in general, and in particular to a condition code register. Still more particularly, the present invention relates to a condition code register architecture for supporting multiple execution units.

2. Description of the Prior Art

Pipelined processors utilize pipelining to increase the rate of instruction execution by allowing a new instruction to begin execution before a previous instruction finished execution, and superscaler processors can issue multiple operations per cycle. Thus, instruction-level parallelism available in programs can be exploited by pipelined, superscalar, or pipelined-superscalar processors. However, this potential parallelism also requires that instructions be fetched at a sufficient rate. Conditional branching instructions presents a problem for instruction fetching because an instruction fetch unit cannot know with certainty which instructions to fetch until the conditional branch instruction is resolved. In addition, when a branch is detected, the target address of the instructions following the branch must be available before the execution of those instructions.

By utilizing branch prediction techniques that are known to have an accuracy rate of at least 95 percent, a prediction unit can be used to predict the outcome of branch instructions, allowing the instruction fetch unit to fetch subsequent instructions according to the predicted outcome. These instructions are then speculatively executed to allow the processor to make forward progress during the time the branch instruction is being resolved. If the prediction is correct, then the results of the speculative execution can be accepted as correct results, which greatly improves processor speed and efficiency. However, if the prediction is incorrect, the completely or partially executed instructions must be "flushed" from the pipeline, and execution of the correct branch must be initiated.

Early processors executed instructions in an order determined by the compiled machine-language code running on the processor and so are referred to as in-order or sequential processors. For superscalar processors, multiple pipelines can simultaneously process instructions when there are no data dependencies between the instructions in each pipeline. These instructions can be processed in different pipelines in an order which is not the order of the instructions in memory. These processors are referred to as out-of-order processors. Thus, greater parallelism and higher performance can be achieved by out-of-order processors having multiple pipelines in which instructions are processed in parallel in any efficient order by taking advantage of any parallel processing opportunities that may be provided by the compiled machine-language code.

Although out-of-order processors greatly improve processing throughput, they also increase processing complexity as compared to sequential processors. For example, out-of-order execution may result in conflicts between instructions attempting to use the same registers even though these instructions are otherwise independent.

Instructions generally produce two types of actions during execution: storing results that are directed to an architectural register location and/or setting condition codes that are directed to one or more architectural condition code registers. The results and the condition codes for any instruction that are speculatively executed cannot be stored in the architectural registers until all conditions prior to the instruction have been resolved. For example, several execution units may be capable of generating condition codes according to pipeline templates of varying lengths. When an execution unit generates a condition code, the generated condition code must be synchronized with condition codes from other execution units before the generated condition code can be committed.

There are many approaches for maintaining program order in the condition code. One approach is to stall the so pipelines while executing a long latency condition code-updating instruction. The pipelines should be stalled long enough for the condition code to be written before the condition code can be read or written by a subsequent instruction. However, this approach requires the addition of an arbitration circuit for controlling which pipeline can write the condition code, and creates a performance problem if the long latency condition code setting instructions are important. Another approach is to extend all of the condition code pipelines to the length of the longest latency unit. Although this approach simplifies the condition code update arbiter, it necessitates a forwarding system to route results that are not yet committed and requires a more complex stall generation circuit that activates when a forward is not possible.

Consequently, it would be desirable to provide an improved condition code register architecture for supporting multiple execution units.

SUMMARY OF THE INVENTION

In accordance with a preferred embodiment of the present invention, a master execution unit is coupled to a master condition code register such that condition codes generated by the master execution unit are stored in the master condition code register. In addition, a non-master execution unit is coupled to a shadow condition code register such that condition codes generated by the non-master execution unit are stored in the shadow condition code register. A tag unit is coupled to the master execution unit and the non-master execution unit such that an entry within the master condition code register can be read only when a corresponding entry within the tag unit is referenced to the master execution unit or the master condition code register.

All objects, features, and advantages of the present invention will become apparent in the following detailed written description.

DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
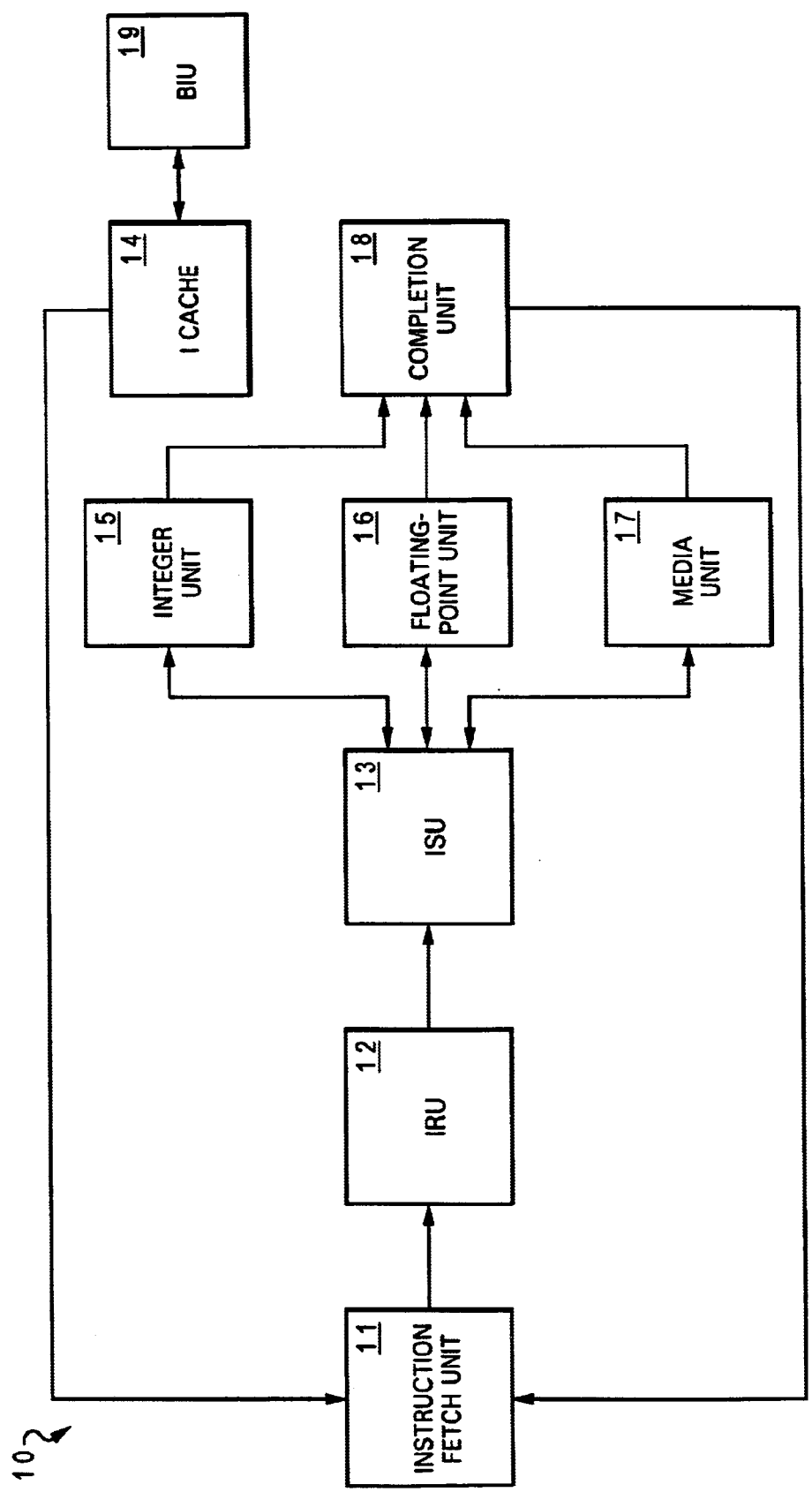
FIG. 1 is a block diagram of a processor in which a preferred embodiment of the present invention is incorporated.

Referring now to the drawings and in particular to FIG. 1, there is depicted a block diagram of a processor in which a preferred embodiment of the present invention is incorporated. Within a processor 10, an instruction cache 14 is coupled to a bus interface unit (BIU) 19. Instruction cache 14 is a high-speed set-associative cache that enables processor 10 to achieve a relatively fast access time to a subset of instructions previously transferred from a main memory (not shown). Instruction cache 14 is further coupled to an instruction fetch unit 11 that fetches instructions from instruction cache 14 during each execution cycle.

Processor 10 also includes three execution units, namely, an integer unit 15, a floating-point unit 16, and a media unit 17. Each of execution units 15–17 can execute one or more classes of instructions, and all execution units 15–17 can operate concurrently during each processor cycle.

After execution has terminated, any one of execution units 15–17 can signal a completion unit 18.

Instruction fetch unit 11 comprises instruction fetch mechanisms, branch prediction logic, and address logic for addressing selected instructions in instruction cache 14.

Instruction fetch unit 11 fetches one or more instructions each cycle by appropriately addressing instruction cache 14. In the absence of a conditional branch instruction, instruction fetch unit 11 addresses instruction cache 14 sequentially. The branch prediction logic in instruction fetch unit 11 handles branch instructions such as conditional and unconditional branches. An outcome tree of each branch instruction is formed using any of a variety of available branch prediction algorithms and mechanisms that are well-known in the art. More than one branch can be predicted simultaneously by supplying sufficient branch prediction resources. After the branches are predicted, the address of the predicted branch rather than the next sequential address is applied to instruction cache 14.

Instruction fetch unit 11 feeds addressed instructions to instruction rename unit (IRU) 12. IRU 12 comprises one or more pipeline stages that include instruction renaming mechanisms and dependency checking mechanisms. The instruction renaming mechanisms map register specifiers in the instructions to physical register locations and perform register renaming to prevent dependencies. IRU 12 also comprises dependency checking mechanisms that analyze the instructions to determine whether or not the operands (identified by the instructions' register specifiers) can be determined until another in-flight instruction has completed. The term "in-flight instruction" as used herein refers to any instruction that has been fetched from instruction cache 14 but has not yet completed or been retired. IRU 12 outputs renamed instructions to an instruction scheduling unit (ISU) 13.

ISU 13 receives renamed instructions from IRU 12 and registers them for execution. Upon registration, instructions are deemed in-flight instructions. ISU 13 schedules and dispatchs instructions as soon as their dependencies have been satisfied into an appropriate execution unit. ISU 13 also maintains trap status of in-flight instructions. ISU 13 may perform other functions such as maintaining the correct architectural state of processor 10, including state maintenance when out-of-order instruction processing is being used. ISU 13 may also include mechanisms to redirect execution appropriately when traps or interrupts occur and to ensure efficient execution of multiple threads where multiple threaded operations are being used. Multiple thread operation means that processor 10 is running multiple substantially independent processes simultaneously.

ISU 13 also operates to retire executed instructions when completed by integer unit 15, floating-point unit 16, and media unit 17. ISU 13 performs the appropriate updates to architectural register files and condition code registers upon complete execution of an instruction. ISU 13 is responsive to exception conditions and discards or flushes operations being performed on instructions subsequent to an instruction generating an exception in the program order. ISU 13 quickly removes instructions from a mispredicted branch and initiates instruction fetch unit 11 to fetch from the correct branch. An instruction is retired when it has finished execution and all instructions on which it depends have completed. Upon retirement, the result of the instruction is written into the appropriate register file and is no longer deemed an in-flight instruction.

The results of operations in processor 10, such as positive, negative, zero, or overflow, are reflected in condition codes that are collected in a condition code register. These condition codes are written explicitly during comparison operations and during explicit write operations to the condition register. The condition codes may also be written implicitly by arithmetic operations and/or load operations to reflect the state of the result of the operation or value loaded.

Instructions that are designed to read condition codes typically read a condition code from the condition code register early in an instruction pipeline, while instructions that are designed to write condition codes typically write a condition code to the condition code register late in the instruction pipeline. When only one execution unit is capable of writing condition code to a condition code register, the only requirement that must be satisfied by a read instruction designed to read from a condition code register is that all preceding instructions that will be writing to the condition code register must have done so prior to the reading of the condition code register by the read instruction. When there are more than one execution unit that can write condition code to the condition code register, correct operation requires that condition codes are written to the condition code register in a manner as to reflect the order in which the instructions occur in the flow of program execution. This ordering procedure is often referred to as condition code synchronization.

Difficulties arise when multiple execution units generate condition codes at different places in their respective pipelines. For example, if integer unit 15 produces its condition codes in the fifth pipeline stage and execution units 16, 17 produce their respective condition codes in the ninth pipeline stage, and integer unit 15 reads the condition code register in the third cycle, then, when floating-point unit 16 produces a condition code precedes an integer instruction that produces a condition code that is intended to be written to the same register field, the condition code from floating-point unit 16 must be written before the condition code from integer unit 15 even if the condition code from floating-point unit 16 is computed after the condition code from integer unit 15.

Figure 2:
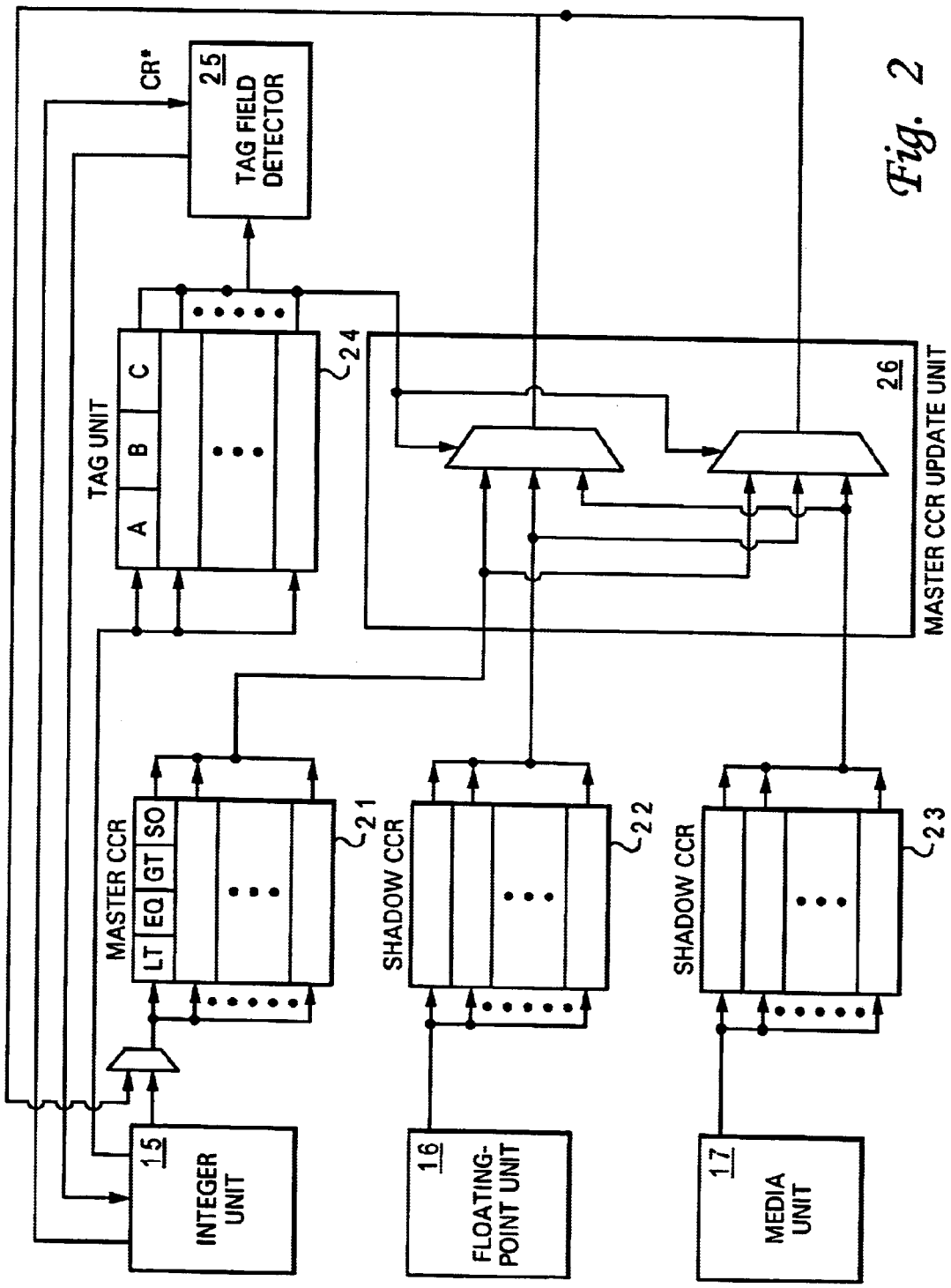
FIG. 2 is a block diagram of a condition code register architecture for supporting multiple execution units, in accordance with a preferred embodiment of the present invention.

Referring now to FIG. 2, there is illustrated a block diagram of a condition code register architecture for supporting multiple execution units, in accordance with a preferred embodiment of the present invention. As shown, each execution unit is provided with its respective condition code register such that each condition code register receives condition codes generated by a corresponding execution unit. For example, a condition code register 21 receives condition code generated by integer unit 15, a condition code register 22 receives condition code generated by floating-point unit 16, and a condition code register 23 receives condition code generated by media unit 17. Each of execution units 15–17 is responsible for sending condition codes to its corresponding condition code register consistently according to its own execution pipeline independent of other execution units and other condition code registers.

In addition, integer unit 15 is preferably designated as a master execution unit while floating-point unit 16 and media unit 17 are designated as non-master execution units because integer unit 15 typically generates more condition codes than floating-point unit 16 and media unit 17. Similarly, condition code register 21 is considered the master condition code register while condition code registers 22, 23 are considered shadow condition code registers. As the master execution unit, integer unit 15 "owns" condition code register 21 (i.e., the master condition code register) such that condition code register 21 cannot be read without the permission of integer unit 15 via a tag unit 24, as will be described later.

Each of condition code registers 21–23 includes multiple rows, and each row includes multiple register fields. The specific number of rows and the specific number of register fields within each row depend on processor architecture. In the example shown in FIG. 2, each of condition code registers 21–23 includes eight rows, and each row includes four register fields, namely, less than (LT), greater than (GT), equal to (EQ), and summary overflow (SO). A condition code is preferably defined by a logical 1 resided in at least one of the four register fields.

Tag unit 24 is coupled to integer unit 15 and condition code register 21. Tag unit 24 includes the same number of rows as condition code register 21, which is eight in this example. Each row in tag unit 24 corresponds to a row in condition code register 21. Each row in tag unit 24 includes several tag fields. The specific number of tag fields in each row depends on the number of execution units (or condition code units). In this example, there are three tag fields in each row because there are three execution units 15–17 (or three condition code units 21–23). Specifically, tag field A corresponds to integer unit 15 (or condition code unit 21), tag field B corresponds to floating-point unit 16 (or condition code unit 22), and tag field C corresponds to media unit 17 (or condition code unit 23). The tags within tag fields A, B, and C should be regarded as hidden program state that must be recovered when an exceptional event is processed.

In this implementation, only one of the three tag fields in each row of tag unit 24 may contain a logical 1 to refer to an execution unit (or a condition code register). Integer unit 15 (master execution unit) is referenced by tag unit 24 if the logical 1 is resided in tag field A, floating-point unit 16 (non-master execution unit) is referenced by tag unit 24 if the logical 1 is resided in tag field B, and media unit 17 (non-master execution unit) is referenced by tag unit 24 if the logical 1 is resided in tag field C. When integer unit 15 is referenced by tag unit 24, it means the register field in the corresponding row of master condition code register 21 does or will contain the architectural value of the condition code. When integer unit 15 is not referenced by tag unit 24, it means the register field in the corresponding row of master condition code register 21 is invalid and the register field in the corresponding row of a shadow condition code register currently contains or will at some point in the future contain the architectural condition code. In such a case, the register field in the corresponding row of the shadow condition code register needs to be copied to the register field in the corresponding row of the master condition code register before the register field in the corresponding row of the master condition code register can be read. The process of copying is referred to as condition code register update, as will be described in detail later.

When integer unit 15 (the master execution unit) attempts to read a register field from a specified row of condition code register 21, for example, during a branch instruction, the register field may or may not be valid at the time. The validity of a register field can be detected by interrogating a tag field from a corresponding row within tag unit 24 utilizing a tag field detector 25. If tag field detector 25 does not detect a logical 1 in the tag field of the master execution unit (or the master condition code register unit), i.e., tag field A, from the corresponding row of tag unit 24, it means the register field from the corresponding row of the condition code register 21 is invalid, and the correct condition code must be read from one of the shadow condition registers that contains the valid value via a condition code register update.

Figure 3:
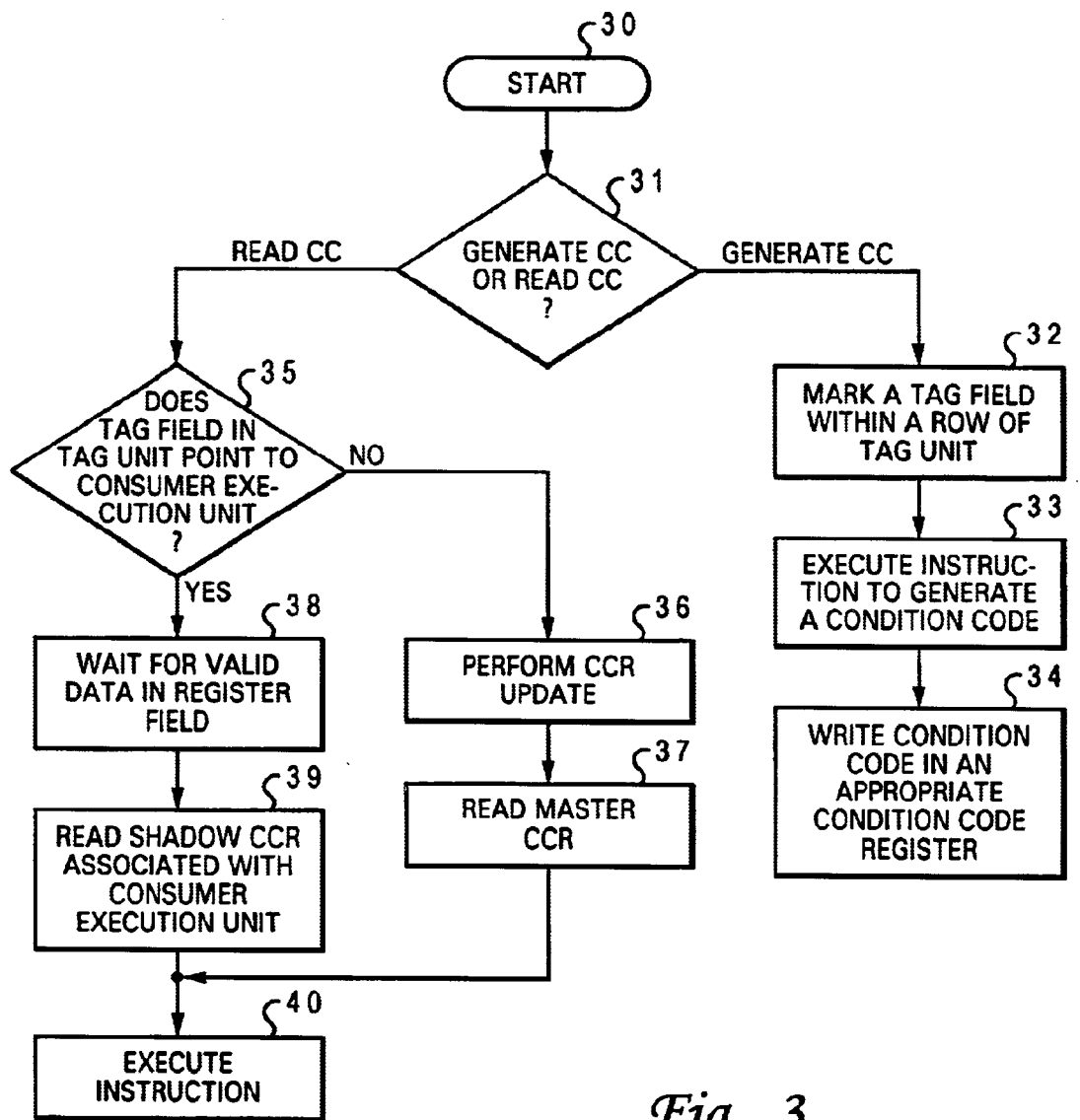
FIG. 3 is a high-level logic flow diagram of a method for sharing a condition code register by multiple execution units utilizing the condition code register architecture from FIG. 2, in accordance to a preferred embodiment of the present invention.

Referring now to FIG. 3, there is illustrated a high-level logic flow diagram of a method for sharing a condition code register by multiple execution units utilizing the condition code register architecture from FIG. 2, in accordance to a preferred embodiment of the present invention. Starting a block 30, a determination is made as to whether or not an instruction from an execution unit is for generating a condition code or for reading a condition code, as shown in block 31. If the instruction is for generating a condition code, an appropriate tag field within a row of tag unit 24 (from FIG. 2) is marked accordingly. The marking can be performed by the master execution unit (i.e., integer unit 15). For example, if an instruction from floating-point unit 16 is for generating a condition code EQ to be placed in row 3 of condition code register 22, then tag field B within row 3 of tag unit 24 is changed from a logical 0 to a logical 1 (tag field A and tag field B in row 3 remain to be logical 0). The instruction is then executed to generate a condition code, as depicted in block 33. The condition code is subsequently written to an appropriate row of the corresponding condition code register, according to the generated condition code, as illustrated in block 34. Using the same example, the EQ register field within row 3 of condition code register 22 is changed from a logical 0 to a logical 1 (the other three register fields in row 3 remains to be logical 0).

Otherwise, if the instruction is for reading a condition code, such as during a branch instruction, a determination is made as to whether or not a specified row within tag unit 24 is referring to a consumer execution unit (or its corresponding condition code register) that is responsible for executing the instruction, as shown in block 35. A consumer execution unit is an execution unit that reads a condition code, and a producer execution unit is an execution that write a condition code. Any execution unit, whether or not it is a master execution unit, can be a consumer execution unit or a producer execution unit, depending on the function it is performing at the time. If the corresponding row within tag unit 24 is referring to the consumer execution unit, then an appropriate register field within the corresponding row of the shadow condition code register associated with the consumer execution unit is read, as depicted in block 39, after the data in the appropriate register field becomes valid, as depicted in block 38. Subsequently, the instruction is executed, as illustrated in block 40. If the corresponding row within tag unit 24 is not referring to the consumer execution unit, then a condition code register update procedure is performed, as depicted in block 36. Then, an appropriate register field within the specified row of the master condition code register is read, as depicted in block 37. Subsequently, the instruction is executed, as illustrated in block 40.

If the master execution unit is not referenced by the corresponding row within tag unit 24, the master condition code register (i.e., condition code register 21) must first be updated before the instruction can be issued. But before the master condition code register can be updated, the master execution unit must wait for the shadow condition code register that contains or will contain the valid condition code (i.e., condition code registers 22 and 23) to generate its value. The update is subsequently performed by a master condition code register update unit 26 to copy the condition code value from the shadow condition code register to the master condition code register. The corresponding row of tag unit 24 is updated to reference to the corresponding tag field in the master condition code register.

While the condition code register update procedure can be performed for each shadow condition code register one at a time, it is possible to perform the condition code register update for all condition code fields in parallel.

As has been described, the present invention provides a condition code register architecture for supporting multiple execution units. While without sacrificing performance, the condition code register architecture of the present invention simplifies the logic for updating multiple condition code registers to a point that is similar to updating a condition code register for a processor having only one execution unit.

While the invention has been particularly shown and described with reference to a preferred embodiment, it will be understood by those skilled in the art that various changes in form and detail may be made therein without departing from the spirit and scope of the invention.

What is claimed is:

1. A condition code register architecture for supporting multiple execution units, said condition code register architecture comprising:

a master execution unit coupled to a master condition code register such that condition codes generated by said master execution unit are stored in said master condition code register;

a non-master execution unit coupled to a shadow condition code register such that condition codes generated by said non-master execution unit are stored in said shadow condition code register; and a tag unit coupled to said master execution unit and said non-master execution unit such that a row within said master condition code register can be read only when a corresponding row within said tag unit is referenced to said master execution unit or said master condition code register.

2. The condition code register architecture according to claim 1, wherein said condition code register architecture further includes a second non-master execution unit coupled to a second shadow condition code register such that condition codes generated by said second non-master execution unit are stored in said second shadow condition code register.

3. The condition code register architecture according to claim 1, wherein said tag unit includes a plurality of rows, wherein each row includes a plurality of tag fields.

4. The condition code register architecture according to claim 3, wherein said number of tag fields is identical to a total number of execution units within said condition code register architecture.

5. The condition code register architecture according to claim 3, wherein said number of tag fields is identical to a total number of condition code registers within said condition code register architecture.

6. The condition code register architecture according to claim 1, wherein each of said condition code registers include a plurality of rows, wherein each row includes a plurality of register fields.

7. A method for sharing a condition code register by multiple execution units, said method comprising the steps of:

coupling a master execution unit to a master condition code register such that condition codes generated by said master execution unit are stored in said master condition code register;

coupling a non-master execution unit to a shadow condition code register such that condition codes generated by said non-master execution unit are stored in said shadow condition code register; and coupling a tag unit to said master execution unit and said non-master execution unit such that a row within said master condition code register can be read only when a corresponding row within said tag unit is referenced to said master condition code register.

8. The method according to claim 7, wherein said method further includes a step of coupling a second non-master execution unit to a second shadow condition code register such that condition codes generated by said second non-master execution unit are stored in said second shadow condition code register.

9. The method according to claim 7, wherein said tag unit includes a plurality of rows, wherein each row includes a plurality of tag fields.

10. The method according to claim 9, wherein said number of tag fields is identical to a total number of execution units within said condition code register architecture.

11. The method according to claim 9, wherein said number of tag fields is identical to a total number of condition code registers within said condition code register architecture.

12. The method according to claim 7, wherein each of said condition code registers include a plurality of rows, wherein each row includes a plurality of register fields.

* * * * *